US008436750B2

(12) United States Patent
Fabre et al.

(10) Patent No.: US 8,436,750 B2
(45) Date of Patent: May 7, 2013

(54) METHOD OF MONITORING THE LANDING PHASE OF AN AIRCRAFT

(75) Inventors: Bernard Fabre, Fonsorbes (FR); Pascal Gayraud, Toulouse (FR); Nicolas Marty, Saint Sauveur (FR)

(73) Assignee: Thales, Neuilly sur Seine (FR)

(*) Notice: Subject to any disclaimer, the term of this patent is extended or adjusted under 35 U.S.C. 154(b) by 909 days.

(21) Appl. No.: 12/557,366

(22) Filed: Sep. 10, 2009

(65) Prior Publication Data

US 2010/0079308 A1 Apr. 1, 2010

(30) Foreign Application Priority Data

Sep. 16, 2008 (FR) ..................................... 08 05069

(51) Int. Cl.
*G05B 5/00* (2006.01)

(52) U.S. Cl.
USPC ............. 340/951; 340/963; 340/972; 342/29; 701/16; 701/301

(58) Field of Classification Search .................. 340/951, 340/947, 948, 960, 963, 972; 342/29, 32, 342/65; 701/16, 18, 300, 301; 702/34
See application file for complete search history.

(56) References Cited

U.S. PATENT DOCUMENTS

| | | | | |
|---|---|---|---|---|
| 7,587,278 | B2 * | 9/2009 | Poe et al. | 701/301 |
| 8,116,989 | B2 * | 2/2012 | Journade et al. | 702/34 |
| 2001/0052562 | A1 | 12/2001 | Ishihara et al. | |
| 2004/0167685 | A1 * | 8/2004 | Ryan et al. | 701/16 |
| 2008/0195301 | A1 | 8/2008 | Fabre et al. | |
| 2009/0048724 | A1 * | 2/2009 | Caule | 701/16 |
| 2009/0201197 | A1 | 8/2009 | Coulmeau et al. | |
| 2010/0070115 | A1 * | 3/2010 | Villaume | 701/18 |

FOREIGN PATENT DOCUMENTS

| | | | |
|---|---|---|---|
| EP | 1 496 413 | A | 1/2005 |
| FR | 2 895 726 | A | 7/2007 |
| FR | 2 897 593 | A | 8/2007 |
| FR | 2 906 066 | A | 3/2008 |

* cited by examiner

*Primary Examiner* — Hung T. Nguyen
(74) *Attorney, Agent, or Firm* — LaRiviere, Grubman & Payne, LLP

(57) ABSTRACT

The invention is a method making it possible to calculate and monitor the provisional landing distance and the configuration of the aircraft and flight parameters during the changes in the landing phase manoeuvre. The method consists in determining the landing runway then in analyzing the configuration and the dynamic parameters of the aeroplane, the meteorological and airport data in order to assess, from a performance database, whether the planned braking is suitable and will stop the aeroplane before the end of the runway.

11 Claims, 3 Drawing Sheets

METHOD OF MONITORING THE LANDING PHASE OF AN AIRCRAFT

PRIORITY CLAIM

This application claims priority to French Patent Application Number 08 05069, entitled Method of Monitoring the Landing Phase of an Aircraft, filed on Sep. 16, 2008.

FIELD OF THE INVENTION

The field of the invention relates to the monitoring of the landing phase of an aircraft.

BACKGROUND OF THE INVENTION

The landing phase is very short compared to the duration of a flight, it constitutes the transition between the flight and taxiing on the ground. However, accidents occur for many reasons: approach speed too high for the runway length, poor assessment of the runway conditions, runway touchdown point too distant, etc. Examples can be cited, taken from publications of enquiry reports produced by the Bureau d'Enquêtes et d'Analyses for safety in civil aviation. The objective of the following examples is to define the issues in the field.

Accident involving a 747 operated by the French airline Air France that occurred on 13 Nov. 1993 at Tahiti Faaa airport. In the final approach phase, the active pilot sought to counter an automatic go-around triggered by the automatic flight system. He continued the approach by over-riding the automatic throttle. During the landing, the left outer jet engine started up in positive full thrust mode. The aircraft then left the runway to the right and finished up in the lagoon. The accident was due to an unstabilized approach and the selection of strong positive thrust mode for engine 1 on landing, consequence of a peculiarity of the automatic flight system leading to the transition to go-around mode at a point in the trajectory corresponding to the decision height. This led to the long touchdown with excessive speed and the deviation from the trajectory to the right and the lateral exit from the runway.

Accident involving a 747 operated by Cameroon Airlines that occurred on Nov. 5, 2000 at Paris Charles de Gaule airport. The aeroplane diverted from the runway axis and left the runway, tearing the landing gear and damaging the airframe. The probable cause was the incomplete reduction of the left outer engine at the start of deceleration, having led to the deactivation of the automatic braking systems and the non-release of thrust reverser No. 1. The inadvertent setting of this engine to full power after landing generated a strong thrust dissymmetry that caused the aircraft to leave the runway.

Accident involving an A340 operated by Air France that occurred on 2 Aug. 2005 at Toronto airport. The plane made a long landing on the landing runway and left the end of the runway to finish up in a ravine just outside the perimeter of the airport and the aircraft was destroyed by fire. The probable cause originates from the fact that, during the levelling-off sub-phase of the landing phase, the aircraft entered into an area of strong showers, the wind had turned leading to a tailwind component of approximately 5 knots. The runway had become contaminated, being covered with at least a quarter inch of stagnant water. The aircraft touched the ground at a distance of approximately 4000 feet on the 9000-foot runway.

Nowadays, the systems used are systems that enable the pilot to choose the type of braking: strong, moderate, weak according to the landing runway length and the runway exit chosen to begin the route to the airport area.

There are patent documents that describe a device displaying the stopping position of the aeroplane and supplying the appropriate deceleration commands to the braking system for the aeroplane to be able to leave the chosen taxiway. Not all aircraft can be equipped therewith, because such devices involve complex devices with a plurality of miscellaneous collaborating computers. Among these documents, there is U.S. Pat. No. 5,968,106 describing an automatic braking system that makes it possible to finalize the travel of an aircraft at a precise point.

The systems described hereinbelow take into account the current deceleration conditions to predict and calculate the braking distance. This basic calculation mode does not always make it possible to offer a relevant alert.

One known system is described in French patent application FR 2842337. This is a method and device to assist in the driving of a vehicle that makes it possible to calculate and display the distance needed to reach a particular speed value according to an initial speed and a defined deceleration. This system makes it possible, for example, to assess the distance needed to perform a landing. However, the assessment method does not take into account the external braking conditions, notably the meteorological parameters.

Also known is for French patent application FR 2897593 describing a method and a system predicting the possibility of completely stopping an aircraft on a landing runway. This application takes account only of the descent angle of the approach to calculate the deviation relative to the runway threshold.

The solutions described in these documents do not make it possible to implement a solution for monitoring the landing phase. The solutions described do not take into account the meteorological conditions, the status of the landing runway, the parameters and the flight configurations of the aircraft, notably the engine specs and aerofoil configuration. The examples of accidents cited above show that they are due to the weather, inappropriate flight manoeuvres or automatic flight control instructions that are inconsistent with the landing phase.

SUMMARY OF THE INVENTION

The aim of this invention is to implement a landing monitoring method that makes it possible to alert the pilot before the aeroplane is no longer in conditions of safety and before the situation leads to an accident or incident.

More specifically, the invention is a method of monitoring the landing phase of an aircraft comprising means for generating alerts monitoring the provisional landing distance and the configuration of the aircraft throughout the changes in the landing phase manoeuvre, these means comprising a navigation system, performance databases, meteorological measurement sensors and data acquisition means, characterized in that the method performs the following steps:

- determination of sub-phases forming the landing phase, from the runway approach phase onwards, in order to monitor the configuration of the aircraft and the flight parameters with each of the sub-phases,
- determination of the runway status conditions by means of data originating from a plurality of meteorological measurement sources, the number of sources changing throughout the landing sub-phases, the most pessimistic meteorological measurements being retained to determine the status of the runway.

calculation of the provisional landing distance according to a braking performance chart comprising as input parameters runway status parameters, flight parameters and aircraft configuration parameters, the landing distance being re-assessed according to the trend of the input parameters throughout the changes in the landing sub-phases.

Advantageously, the method determines the following sub-phases: a first approach sub-phase before the landing gear is released, a second sub-phase preceding the overfly of the runway, a third sub-phase of overflying the runway preceding contact with the ground and a fourth sub-phase until the ground speed of the aircraft becomes less than approximately 50 kts. Thus, the monitoring system is capable of monitoring the configuration of the aircraft and the instantaneous flight parameters specifically for each of the sub-phases. The monitoring targets the avionics devices and precise flight parameters according to each sub-phase and makes it possible to detect a configuration or behaviour that may be hazardous in a specific landing sub-phase.

Advantageously, during the fourth sub-phase, the status conditions of the runway are re-assessed by means of a performance chart according to a measurement of the deceleration and the ground speed of the aircraft, this chart defining a deceleration value according to the ground speed and runway surface status profiles for a given braking mode.

Advantageously, from the second sub-phase and to determine the landing runway, the runway data of the airport data in the on-board navigation system are compared with the location data of the aircraft and the ground speed vector data of the aircraft.

Advantageously, as soon as the aircraft overflies the landing runway, the runway surface status is re-assessed by a meteorological measurement of the runway surface status performed by an on-board measuring device positioned under the aircraft.

Advantageously, the means for generating alerts detect an engine thrust dissymmetry.

Advantageously, the means for generating alerts signal that the engine speed is too high for the aircraft to perform the third landing sub-phase in conditions of safety or one of a braking dissymmetry when aeroplane is on the ground.

Advantageously, alerts inform that the aerofoil configuration does not conform to the current landing sub-phase.

Advantageously, for the calculation of the landing distance, the configuration parameters of the aircraft include the activation of the thrust reversers or the configuration of the aerofoils.

The monitoring method and the associated device make it possible to improve the safety of the landing phases by taking into account the aeroplane parameters, the aeroplane performance data, and the data concerning the surface status of the runway. This device operates regardless of the braking mode used: manual, selected deceleration rate or deceleration suited to the chosen runway exit point. Furthermore, it acts before the aeroplane touches down, which gives the pilot the option of carrying out a go-around in order to avoid a landing that would end in a departure from the runway.

BRIEF DESCRIPTION OF THE DRAWINGS

The invention will be better understood and other benefits will become apparent from reading the following description, given by way of non-limiting example, and from the appended figures in which.

DETAILED DESCRIPTION OF PREFERRED EMBODIMENT

Figure 1:
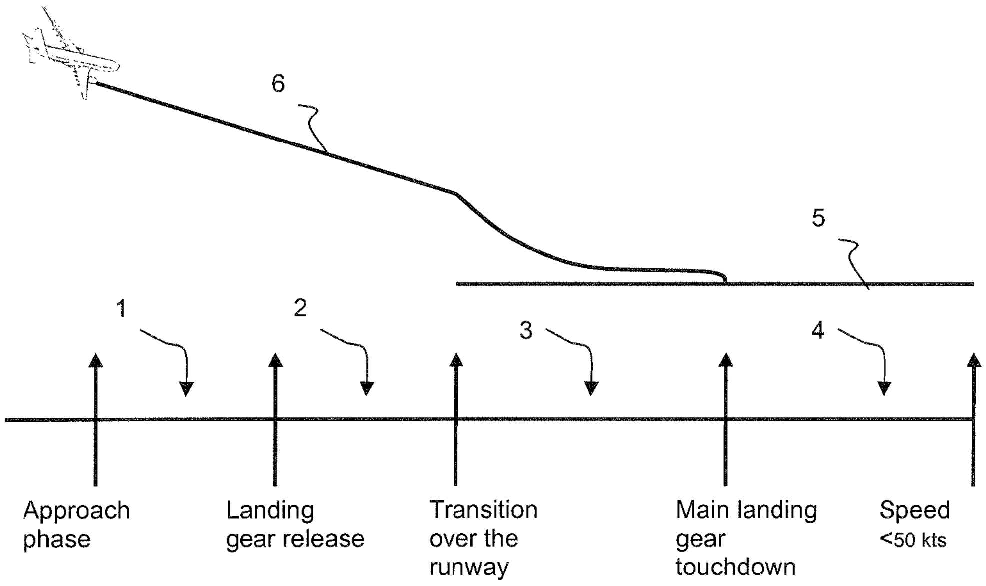
FIG. 1 represents the landing phase of an aircraft comprising a number of sub-phases determined by the monitoring method. Each of these steps requires specific monitoring.

The present invention is a method of monitoring the landing phase of an aircraft. Right from the approach phase of the landing, the method assesses a braking distance by taking as input parameters the status of the runway, the flight parameters and the configuration of the aircraft. All of these parameters are taken into account and re-assessed throughout the execution of the landing phase. As the landing phase progresses, the input data are consolidated by additional data sources making it possible to correct and adjust the calculation of the landing distance in order to generate alerts in risky situation cases.

Implementing the monitoring method involves a number of dedicated calculation functions: a first function for determining the landing runway, a second function for determining the sub-functions that make up the landing phase, a third function for assessing the surface conditions of the landing runway, a fourth function for calculating the landing distance and a fifth function for generating the alerts monitoring the configuration of the aircraft and the landing distance. The first three functions supply their output data to the fourth function in order to calculate the landing distance. The fifth function for generating alerts incorporates all the data from the first four functions in order to generate the potential alerts. The method thus makes it possible to provide overall monitoring of the landing phase by taking into account the aircraft's internal and external parameters.

The first function for determining the landing runway takes as input parameters the data originating from the airport databases and the location data and flight parameters of the aircraft. The databases contain the characteristics of the runways, notably the location of their threshold and their length. During the first landing sub-phase, the approach phase, the landing runway is supplied by the navigation system, commonly called FMS which stands for "Flight Management System". The landing runway data are derived from data in the active flight plan, which contains the runway of the destination airport.

The data corresponding to the characteristics of the runways, notably the runway identification, are of ARINC 424 type. The ARINC 424 data define the database of the navigation system.

Advantageously, from the second sub-phase and to determine the landing runway, the airport data of the on-board navigation system, notably the landing runway data, are compared with the location data of the aircraft and the ground speed vector data of the aircraft. Thus, the method is capable of assessing the runway on which the aircraft is likely to land independently of the runway selected in the FMS. This determination method is aimed at the case where the pilot performs an approach that does not correspond to that entered in the flight manager. Preferably, the location system used is a satellite, "GPS" or "Galileo", system or a hybridized IRS-GPS system.

The second function for determining the landing sub-phases uses as input parameters location, radioaltimetry and configuration data and aeroplane parameters of the aircraft, notably to detect the releasing of the landing gear and touch-down on the ground, ground speed data and data supplied by the first function for determining the landing runway. The way that the landing phase is segmented into a plurality of sub-phases makes it possible to monitor each of these sub-phases with specific parameters. For example, on the transition over the threshold of the runway, particular ground speed and altitude conditions can thus be tested and used to obtain information warning of the landing phase execution conditions. During the fourth phase, once the aircraft is on the ground, the particular conditions regarding the thrust symmetry of the engines are tested and the braking deceleration is also assessed.

As represented in FIG. 1, the method determines the following sub-phases: a first approach sub-phase 1 before the releasing of the landing gear, a second sub-phase 2 preceding the overfly of the landing runway, a third sub-phase 3 of overflying the runway preceding contact with the ground and a fourth sub-phase 4 until the ground speed of the aircraft becomes less than approximately 50 kts.

The monitoring method is engaged when the flight management system FMS switches to approach sub-phase 1, it recovers the runway 5 selected by the pilot in the flight management system to assess whether the conditions will allow stopping on the runway. The method becomes inactive as soon as the aeroplane switches to go-around mode.

When the landing gear is released, the method re-checks that the braking mode selected by the pilot, which can be manual, with defined deceleration or with "adaptive" deceleration adjusting the braking to the taxiway exit, will allow for stopping on the runway taking into consideration the runway characteristics and status.

The transition over the runway threshold is determined by using the data from the location system when they are sufficiently accurate and runway data. At this moment, the height above the ground is measured by the radioaltimeter to compare it to 50 feet, the standardized height for calculating the landing distance.

As for the horizontal distance, separating said aircraft the near end threshold of said landing runway, it can be obtained from positioning information of said aircraft delivered by a satellite positioning system, of the GPS "Global Positioning System" or "Galileo" type, and information delivered by a database containing at least the positioning of the proximal threshold of said landing runway.

When the aeroplane is located above the runway in the levelling-off phase, the method re-assesses the stopping conditions by taking into account the surface status of the measured runway, the position of the aeroplane and its speed. If there is no engine failure, it checks that all the engines are at very similar speeds and slowing down from a certain radio-altimetric height, defined in the configuration parameters. Wheel touchdown is confirmed by a load sensor fitted on the landing gear which experiences, for example, an abrupt compression of the hydraulic dampers of the landing gear.

The engine speed data are supplied by the FADEC system, the acronym standing for Full Authority Digital Engine Control, which describes an automatic regulator with full redundant aeroplane engine authority. The FADEC is a system that relies on a computer that interfaces between the cockpit and the aeroplane engines. It is used to ensure the operation of the engines.

Upon wheel touchdown, up to a ground speed of approximately 50 kts, the method continues to monitor whether the parameters will still allow for stopping on the runway given the position of the aeroplane on the runway. The method also checks the configuration of the aircraft during the landing phase. Notably, if the reversers are activated, it checks that their action is symmetrical.

The third calculation function of the method determines the surface conditions of the landing runway. The surface status data are preferably supplied by the air control ground segment by data-link communication means, by on-board meteorological radar devices, by an on-board device for detecting precipitation and, possibly, by a runway surface status measuring device that can be positioned under the fuselage of the aircraft. The reflectivity of the atmosphere above the airport is detected by the on-board radar system and gives a measure of the amount of rain over the airport area. The on-board precipitation detection device also supplies a measure of the amount of rain. The data produced by this third function provide a probable state for the runway surface status. The surface status analysis is carried out throughout the changes in the landing sub-phases. The status of the runway is broken down into a number of states: runway dry, covered with snow, ice (this information can originate from data-link data), runway "covered with water" with a number of levels depending on the measured amount of rain. Preferably, the runway status "covered with water" covers a number of rain levels, for example a first level characterizing a damp runway, a second level characterizing a soaked runway, and so on. More generally, the "covered with water" runway states are broken down into a number of rain levels according to a number of levels and values that can be configured according to the desired degree of accuracy.

Figure 2:
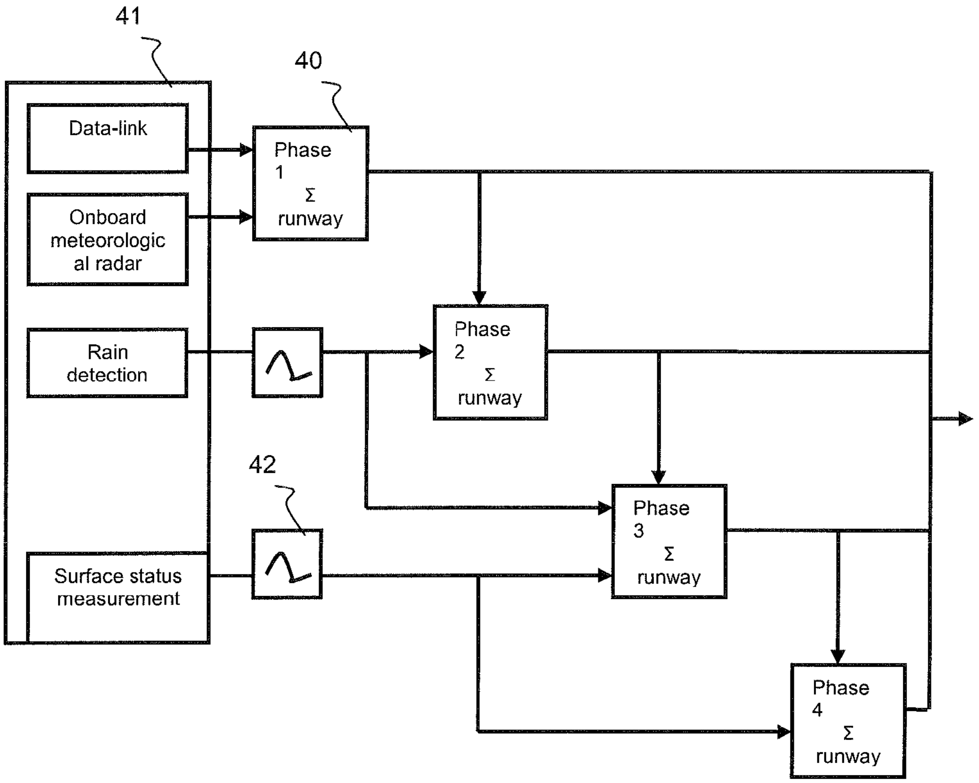
FIG. 2 represents the process of determining the surface status of the landing runway during the changes in the landing phase. The assessment of the surface status is consolidated by new data during the changes in the landing phase manoeuvre.

The surface status of the landing runway is re-assessed on each change of landing sub-phase. FIG. 2 represents the principle of estimating the surface status of the landing runway. The data sources 41 change in order to supply the monitoring system with more accurate data relating to the landing runway.

During the first approach sub-phase, the input parameters supplied to the status estimation function originate from data-link communication. These data are processed by a mapping table. For example, a status N corresponds to drizzly weather, a status N+1 corresponds to weather with stronger showers. The runway states are classified in ascending order of threat to the landing, from dry runway through runway with frozen surface via other states (damp, soaked, as weighed up by a rain level defined by the aircraft manufacturer). Data originating from the AOC, Airline Communication Operation, directly provide a runway status.

The method also extracts from the rain data sent by the on-board meteorological radar a circle of a radius defined in the configuration parameters (for example 5 nautical miles NM) ranging from the ground to an altitude of 3000 feet, centred on the geographic coordinates of the destination airport. This airport is provided by the flight management computer. The average amount of rain in this area is used by a mapping table to provide an assessment of the runway status.

In the approach sub-phase, the method consolidates the data originating from the meteorological radars and from the data-link data. From the two estimates, the method retains the one that is most threatening to the landing. When the aircraft enters into the second sub-phase, the amount of rain is supplied by the rain detector, and is filtered with a time constant which gives an assessment of the surface status. If this assessment is more degraded than the status predicted in the first sub-phase, then this latest status is retained. On entering into the third sub-phase as soon as the aircraft overflies the landing runway, the runway surface status is re-assessed by a meteorological measurement of the runway surface status performed by an on-board measuring device positioned under the aircraft. Throughout the changes in the landing sub-phases, the most pessimistic runway status determined from the various measurement sources is retained. This status measurement is also filtered, at 42, in order to provide a stable value.

Figure 3:
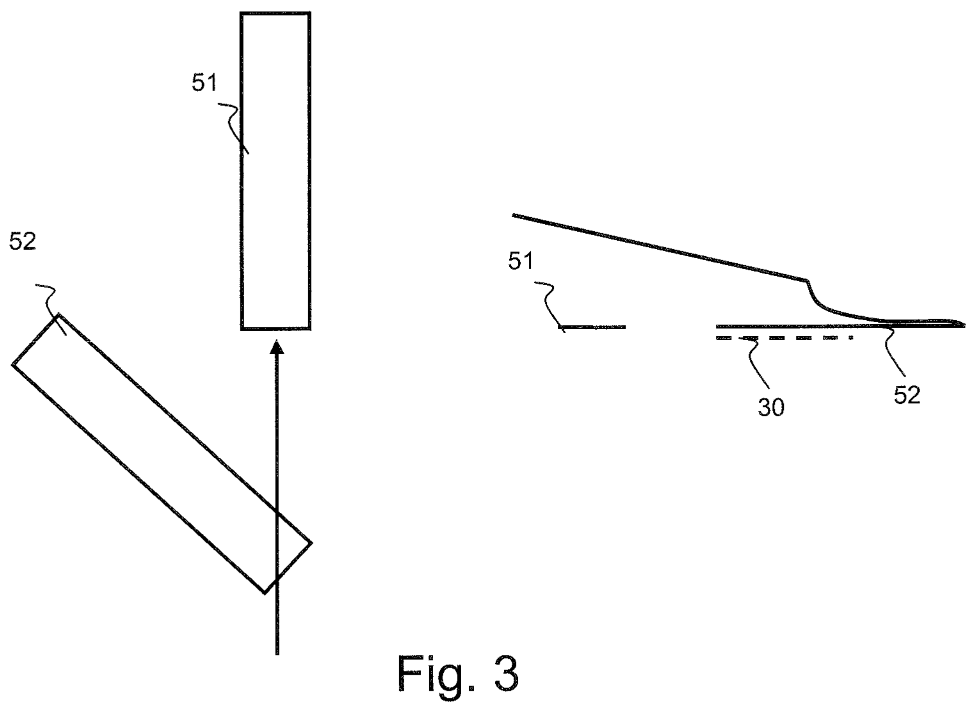
FIG. 3 represents an example of landing phase on a first landing runway close to a second landing runway. This figure illustrates the benefit of the method of detecting the landing runway in this airport configuration.

Throughout the changes in the landing sub-phases, the status of the runways is re-assessed by data sources taking measurements increasingly close to the landing runway. The function for detecting the landing runway and the function for determining the landing phases also make it possible to use, at the appropriate instant, the on-board surface status sensor. FIG. 3 for example represents the situation when the aircraft overflies a first runway 52 before the landing runway 51.

Advantageously, as soon as the aircraft overflies the landing runway, the surface status of the runway 51 is re-assessed by a meteorological measurement of the runway surface status carried out by a specific sensor, an on-board measuring device positioned under the aircraft. At the moment of entry into the third sub-phase, the method triggers the status measurement carried out by the specific sensor. The measurement is performed over the starting portion 30 of the runway 52. This figure also illustrates the case in which the crew performs a visual landing on the runway 51 when the runway 52 is registered in the FMS. By combining the location data of the aircraft and the direction vector of the ground speed, the method determines the runway 51 to be the landing runway and makes it possible to engage the surface status measuring sensor above the landing runway and not the runway registered in the FMS.

The landing distance is assessed with the fourth calculation function from performance tables that give the landing distance from the transition through 50 feet above the runway taking into account the mass, aerofoil configuration, notably the flaps configuration, and runway status data. This distance is then corrected according to the altitude of the runway, the approach speed, the wind data, the centring of the aircraft and the activation of the thrust reversers.

Figure 4:
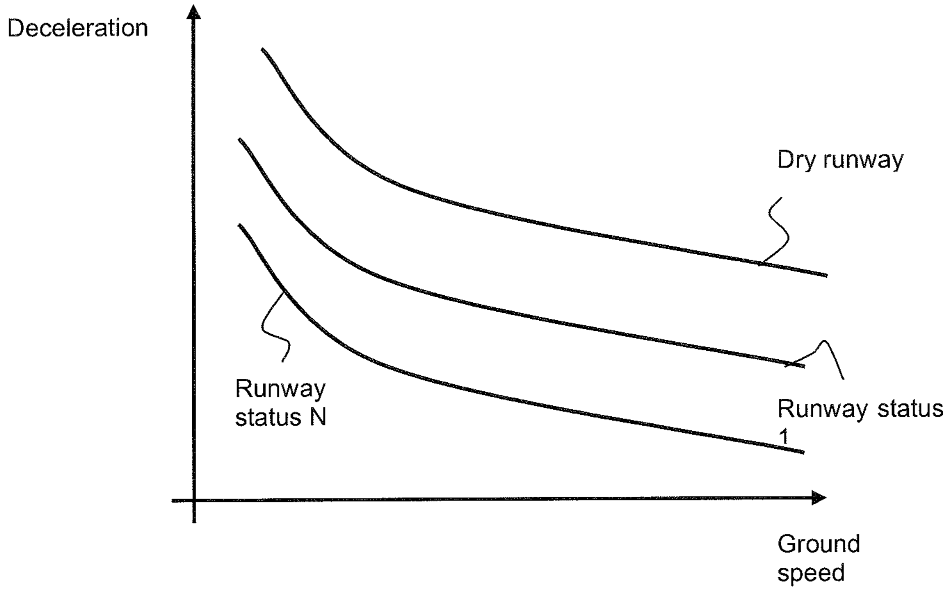
FIG. 4 represents a performance chart of deceleration as a function of the ground speed of the aircraft and a number of surface states of the landing runway for a given braking mode.

A chart for each braking mode (automatic, relatively strong, manual) gives the deceleration profile as a function of the ground speed. In the fourth landing sub-phase corresponding to taxiing on the landing runway, the deceleration value of the aircraft is measured. The type of chart shown in FIG. 4 can be used to compare the planned deceleration with the measured deceleration and thus can be used to re-assess the status conditions of the landing runway and use these conditions to recalculate the landing distance in the fourth sub-phase. Depending on the ground speed and the deceleration, the deceleration performance chart positions a number of landing runway status curves.

Figure 5:
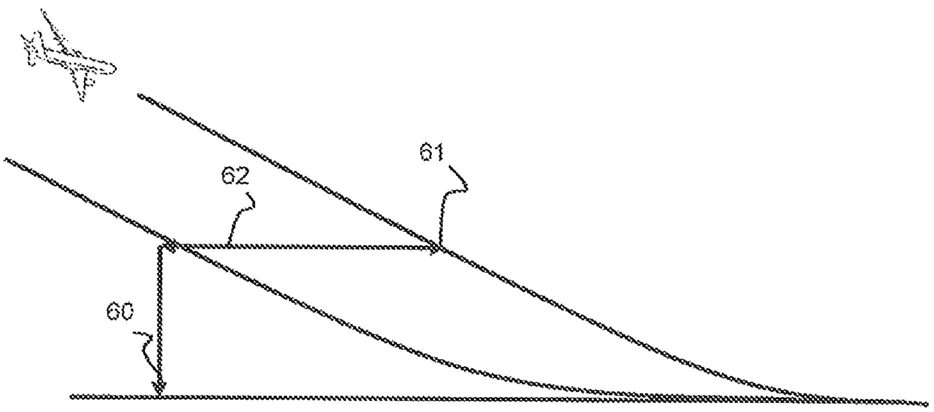
FIG. 5 represents the method of calculating the landing distance and the correction method applied during the third landing sub-phase.

In the third sub-phase, if the uncertainty on the position of the aeroplane is less than a certain threshold, then the method assesses the height of transition of the aeroplane at the runway threshold 60. If this is greater than 50 feet, the excess height gives the additional distance needed for the landing by applying a slope of 3 degrees. FIG. 5 illustrates the method of assessing the landing distance in the third sub-phase. The distance 62 is added to the landing distance assessed by the performance chart in the case where the aircraft is located 50 feet above the runway threshold. The landing distance is updated with the speed, the wind and the surface status of the runway. This distance is then compared with the landing runway distance stored in the databases.

During the four landing sub-phases, the fifth calculation function for preparing alerts monitors the landing distance, notably through an alert ("OVERRUN LANDING") and the configuration of the aircraft, to detect an engine thrust dissymmetry, a braking dissymmetry when the aeroplane is on the ground and the engine speed is high in order for the aircraft to be able to make the landing in conditions of safety.

In the first approach sub-phase, the method uses the calculation result from the performance module to check whether the landing distance is indeed less than the length of the runway available for the landing and if not, generates an alarm.

In the second sub-phase, the calculation function for generating alerts takes into account the current approach speed, the configuration of the extended flaps and the new assessment from the analysis system of the runway surface status. Furthermore, from the probe radio height of 300 feet, the method signals the case in which the spoilers would not be set, and any thrust dissymetries if no engine failure is detected.

When the probe radio height falls below 20 feet for example, this value being able to parameterized, and if the engines are not all slowing down, then an alarm is triggered ("DISYMMETRIC THRUST").

In the fourth sub-phase, the deceleration measured after touchdown of the main landing gear is compared to the deceleration profile corresponding to the type of braking selected by the pilot. A chart for each braking mode (automatic, relatively strong, manual) gives the deceleration profile as a function of ground speed and runway status conditions. The type of chart shown in FIG. 4 can be used to compare the planned deceleration against the measured deceleration and thus can be used to re-assess the status conditions of the landing runway and recalculate with these conditions the landing distance in the fourth sub-phase. This calculation can, if necessary, be used to trigger an alert ("OVERRUN LANDING"). Any dissymmetry in the braking by the engines, "reverses" not released symmetrically, can cause a specific alert ("DISYMMETRIC BRAKING"). Wheel braking is managed by the braking computer.

Figure 6:
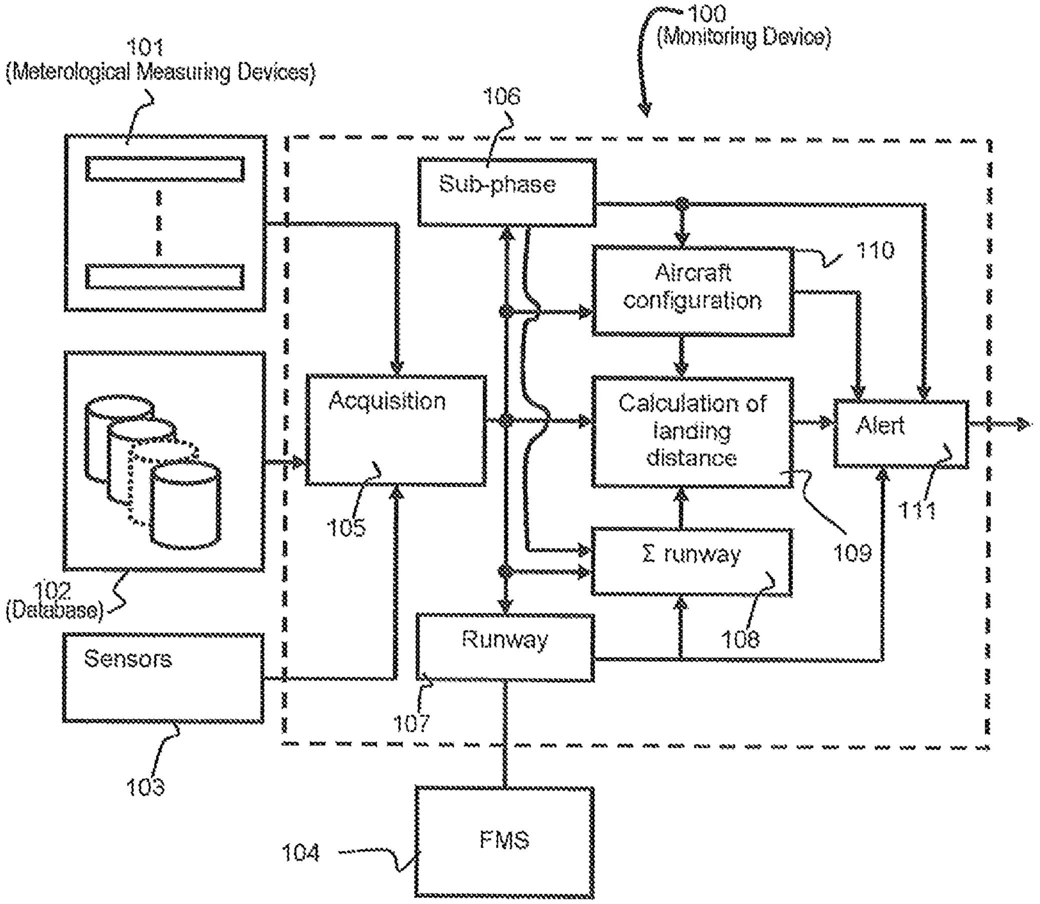
FIG. 6 represents the monitoring device and the arrangement of the calculation means for implementing the monitoring method.

Implementing the inventive method requires the monitoring device 100, illustrated in FIG. 6, for monitoring the landing phase of the aircraft include means 111 for generating alerts monitoring the provisional landing distance and the configuration of the aircraft throughout the changes in the landing phase manoeuvre. To prepare alerts monitoring the landing distance and the configuration of the aircraft, the monitoring device is arranged in such a way as to receive the aircraft flight and configuration parameters 103 originating from the dedicated sensors and from the 102 performance database data aircraft. These data are transmitted:

- for means of determining sub-phases 106 that make up the landing phase,
- for means of determining the landing phase,
- for means of monitoring the configuration of the aircraft and the flight parameters 110 with each of the sub-phases,
- for means of calculating the landing distance 109 throughout the calculated changes in the landing sub-phases.

The landing distance is calculated according to the surface status of the landing runway, the flight and configuration parameters of the aircraft. The surface status of the landing runway is calculated by calculation means 108 taking as input data originating from meteorological measuring devices 101. These measurements are performed by means of the on-board weather radar or on board rain sensors and surface status sensors. The landing distance is determined according to performance charts whose input parameters change in line with the progress of the landing phase, allowing for a re-assessment of the landing phase. The calculation means 106 segment the landing phase into sub-phases at critical moments in the landing phase. These various sub-phases are used to specifically assess the configuration and the flight parameters according to the instants of the landing phase and, furthermore, lead to the re-assessment of the monitoring allowing for a reaction from the pilots at appropriate moments in the event of an incident, notably when the landing gear is released, at the start of overflying the landing runway and on touching down on the runway.

The monitoring device 100 includes means 105 of acquiring data for performing the calculation functions of the method. These acquisition means are used to recover:

the configuration parameters of the aeroplane, namely the status and any failures of the engines, of the thrust reversers, of the spoilers, of the flaps and the landing gear release configuration.

The Flight Data: aeroplane position originating from a system for consolidating various sensors, notably a satellite location system, with the uncertainty associated with this position, ground speed, measured wind, probe radio height, temperature, pressure, mass, centring and selected braking type (manual, automatic with preselection, automatic with adaptation of the braking according to the chosen TAXIWAY exit).

The invention applies to the field of aeronautics for monitoring the aircraft landing phase. The benefit of the method is that it takes into account the intrinsic parameters of the aircraft and the extrinsic parameters, notably the meteorological factors and those associated with the landing runway status.

We hereby claim:

1. Method of monitoring a landing phase of an aircraft comprising means for generating alerts monitoring a provisional landing distance and a configuration of the aircraft throughout the changes in the landing phase maneuver, these means comprising an onboard navigation system, performance databases, meteorological measurement sensors and data acquisition means, comprising the following steps;

a. determination of sub-phases forming the landing phase, from a runway approach phase onwards, in order to monitor the configuration of the aircraft and the flight parameters with each of the sub--phases, b. determination of a runway status condition by means of data originating from a plurality of meteorological measurement sources, a number of sources changing throughout an execution of the landing sub-phases, the meteorological measurement sensors being retained to determine the runway status conditions, and c. calculation of the provisional landing distance according to a braking performance chart comprising input parameters, runway status parameters, flight parameters and aircraft configuration parameters, the landing distance being re-assessed according to a trend of the input parameters throughout the changes in the landing sub-phases.

2. Method according to claim 1, wherein the method determines the following sub-phases: a first approach sub-phase before the landing gear is released, a second sub-phase preceding the overfly of the runway, a third sub-phase of overflying the runway preceding contact with the ground and a fourth sub-phase until the ground speed of the aircraft becomes less than approximately 50 kts.

3. Method according to claim 2, wherein, during the fourth sub-phase, the runway status conditions are re-assessed by means of a performance chart according to a measurement of a deceleration and a ground speed of the aircraft, the performance chart defining a deceleration value according to the ground speed and runway surface status profiles for a given braking mode.

4. Method according to claim 3, wherein, from the second sub-phase and to determine a landing runway, a runway data of the airport data in the on-board navigation system are compared with a location data of the aircraft and a ground speed vector data of the aircraft.

5. Method according to claim 4, wherein, as soon as the aircraft overflies the landing runway, the runway surface status is re-assessed by a meteorological measurement of the runway surface status performed by an on-board measuring device positioned under the aircraft.

6. Method according to claim 1, wherein the means for generating alerts detect an engine thrust dissymmetry.

7. Method according to claim 6, wherein the means for generating alerts signal that the engine speed is too high for the aircraft to perform the third landing sub-phase in conditions of safety.

8. Method according to claim 7, wherein the means for generating alerts warn of a braking dissymmetry when the aeroplane is of the ground.

9. Method according to claim 1, wherein alerts inform that the aerofoil configuration does not conform to the current landing sub-phase.

10. Method according to claim 1, wherein, for the calculation of the landing distance, the configuration parameters of the aircraft include the activation of the thrust reversers.

11. Method according to claim 1, wherein, for the calculation of the landing distance, the configuration parameters of the aircraft include the aerofoil configuration.

* * * * *